(12) United States Patent
Oh et al.

(10) Patent No.: US 8,022,800 B2
(45) Date of Patent: Sep. 20, 2011

(54) FIELD COIL ASSEMBLY FOR ELECTROMAGNETIC CLUTCH

(75) Inventors: Sung-Taeg Oh, Daejeon (KR);
Sung-Won Cho, Daejeon (KR)

(73) Assignee: Halla Climate Control Corp., Daejeon (KR)

( * ) Notice: Subject to any disclaimer, the term of this patent is extended or adjusted under 35 U.S.C. 154(b) by 251 days.

(21) Appl. No.: 12/194,208

(22) Filed: Aug. 19, 2008

(65) Prior Publication Data
US 2009/0050432 A1    Feb. 26, 2009

(30) Foreign Application Priority Data
Aug. 21, 2007   (KR) .................. 10-2007-0084028

(51) Int. Cl.
*H01F 5/00*        (2006.01)
(52) U.S. Cl. .................. 335/296; 335/299; 192/84.1
(58) Field of Classification Search .......... 335/296–299; 192/84.1–84.961
See application file for complete search history.

(56) References Cited

U.S. PATENT DOCUMENTS
5,687,823 A * 11/1997 Nakagawa et al. ...... 192/84.961

FOREIGN PATENT DOCUMENTS
JP    10-37978 A    2/1998
JP    2002-39214 A    2/2002

* cited by examiner

*Primary Examiner* — Ramon M Barrera
(74) *Attorney, Agent, or Firm* — Birch Stewart Kolasch Birch, LLP

(57) ABSTRACT

A field coil assembly for an electromagnetic clutch, which includes an electromagnetic coil body formed by winding an electromagnetic coil; a bobbin for supporting the electromagnetic coil body; a field core for receiving the bobbin and the electromagnetic coil body; a holder mounted to the electromagnetic coil body; and a thermal fuse installed to the holder to be connected to the electromagnetic coil body, wherein the holder having the thermal fuse installed thereto is provided with an elastic member for elastically supporting the thermal fuse upwards. Thus, the height of the thermal fuse installed to the holder can be adjusted.

4 Claims, 5 Drawing Sheets

FIELD COIL ASSEMBLY FOR ELECTROMAGNETIC CLUTCH

BACKGROUND OF THE INVENTION

1. Field of the Invention

The present invention relates to a field coil assembly for an electromagnetic clutch, and more particularly, to a field coil assembly for an electromagnetic clutch, wherein a thermal fuse is installed to a holder mounted to an electromagnetic coil body so that the height of the thermal fuse may be variably adjusted, thereby preventing damage in the thermal fuse which may be caused by a injection molding apparatus during an injection molding process.

2. Description of the Related Art

Generally, a field coil assembly for an electromagnetic clutch is an electric apparatus, in which when electric power is supplied, the electromagnetic induction of a wound coil in the field coil assembly causes a magnetic field to be generated and the magnetic force accordingly causes a disc of a pulley and a hub disc of a driving shaft of a compressor to be connected to each other, so that the electromagnetic clutch may cause the driving force of the pulley rotated by an engine to be transmitted to the hub disc of the driving shaft of the compressor. As such, the field coil assembly for an electromagnetic clutch serves to intermit power applied to the compressor depending on whether or not the electric power is supplied to the wound coil, so that the operation of a cooling system in an air conditioning apparatus can be controlled.

The field coil assembly for an electromagnetic clutch as described above includes a thermal fuse for causing the coil to be shorted when the clutch of the compressor is overheated.

In addition, when the compressor is locked due to any abnormal reasons, the thermal fuse is shorted by slip heat of the clutch, which would be generated before the compressor is locked, to cut off the electric power supplied to the electromagnetic coil, thereby causing the load due to the lock of the compressor not to be applied to the engine as well as preventing a driving belt of the compressor from being damaged.

Specifically, since the disc of the pulley slips with respect to the hub disc of the driving shaft when the compressor is locked, the temperature is excessively increased in such slipping portions. Considering the foregoing, the thermal fuse is installed adjacent to the disc of the pulley so that the thermal fuse is shorted due to the abnormal increase in temperature of such slipping portions.

Patent applications concerning such a conventional field coil assembly for an electromagnetic clutch have been filed in the name of the present applicant. FIGS. 1 and 2 show an example of a conventional field coil assembly for an electromagnetic clutch which has been proposed by the applicant.

As shown in FIG. 1, a field coil assembly 2 for an electromagnetic clutch includes an electromagnetic coil body 30 formed by winding an electromagnetic coil in a ring shape; a bobbin 20, which is made of a ring-shaped synthetic resin material and has one side being open, for receiving the electromagnetic coil body 30 therein to maintain the shape of the electromagnetic coil body 30; a field core 10, which has one side being open and receives the bobbin 20 through the open side in a groove 11 formed in the field core 10 to thereby protect the bobbin 20 and the electromagnetic coil body 30 in the bobbin 20 from an externally impact; and an epoxy injection molded body 40, which is injection molded into the field core 10 to fill a space between the bobbin 20 and the field core 10 and to fix the bobbin 20 and the electromagnetic coil body 30 into the field core 10.

In addition, as shown in FIG. 2, an outer surface of the electromagnetic coil body 30 provided in the field core 10 is provided with a holder 50, which is an insulating body formed of a circular-arc-typed plate corresponding to the outer surface of the electromagnetic coil body 30. The holder 50 is mounted with a thermal fuse 60 for disconnecting the electromagnetic coil body 30 when the clutch of the compressor is overheated.

The holder 50 is formed with a base 51 which is curved in a circular arc shape along the outer surface of the electromagnetic coil body 30. Mounting protrusions 52 are formed to protrude downwards along outer peripheries of both curved side edges of the base 51 so that the holder 50 can be fitted onto and coupled to the electromagnetic coil body 30. Two holes 51a are bored through one side of the base 51 so that two lead wires 31 of the electromagnetic coil body 30 are withdrawn toward both sides of an upper portion of the holder 50 through the holes 51a, respectively.

Further, protrusions 53 between which the thermal fuse 60 is inserted and seated are formed to protrude on the upper surface of the base 51 of the holder 50. Coupling protrusions 54, into which terminals 55 for allowing lead wires 61 of the thermal fuse 60 and the lead wires 31 of the electromagnetic coil body 30 to be electrically connected are fixedly inserted, are formed to protrude at both sides of the protrusions 53, respectively.

Meanwhile, the protrusions 53 protrude from the base 51 of the holder 50 in a vertical direction thereto and comprise a pair of plates which are spaced apart from each other on the base 51. Reference numeral 21 in FIG. 1 designates a connection protrusion, which is formed on the bobbin 20 and coupled for lead-out wires of the electromagnetic coil body 30 to be connected.

A process of assembling the conventional field coil assembly 2 for an electromagnetic clutch so configured will be described. First, the terminals 55 are fixedly inserted into the coupling protrusions 54 formed on the upper surface of the holder 50, and then, the mounting protrusions 52 at both the sides of the holder 50 enclose the outer surface of the electromagnetic coil body 30 which is received in the bobbin 20, so that the holder 50 is fixed to the electromagnetic coil body 30.

In such a state, the thermal fuse 60 is inserted and fixed between the protrusions 53 of the holder 50 and both the lead wires 61 of the thermal fuse 60 are press-fitted into both the terminals 55 as shown in FIG. 2 to thereby be electrically connected to the terminals 55, respectively. Further, both the lead wires 31 of the electromagnetic coil body 30 are also withdrawn through the holes 51a of the holder 50 and then press-fitted into both the terminals 55 to thereby be electrically connected to the terminals 55. As a result, the lead wires 31 of the electromagnetic coil body 30 are electrically connected to the lead wires 61 of the thermal fuse 60 through the terminals 55, respectively.

Finally, after the bobbin 20 in which the electromagnetic coil body 30 so coupled is provided is inserted into the field core 10, an epoxy resin is injected and molded into the field core 10 using an injection molding apparatus. Therefore, the electromagnetic coil body 30 and the bobbin 20 are fixed inside of the field core 10 as well as the electromagnetic coil body 30 and the field core 10 are insulated from each other.

Meanwhile, during such a molding process, the thermal fuse 60 is not completely embedded by the epoxy resin but is encapsulated so that one side thereof is exposed to the outside, whereby the accuracy of the temperature sensing function in the thermal fuse 60 can be further improved.

However, in the conventional field coil assembly 2 for an electromagnetic clutch so configured, the electromagnetic coil body 30 is formed by winding the electromagnetic coil several times. If the winding number of the electromagnetic coil or the overlapped type of the electromagnetic coil is varied, the height of the electromagnetic coil body 30 is not uniform, so that the protrusion degree of the thermal fuse 60 which is mounted to the electromagnetic coil body 30 through the holder 50 may vary.

Accordingly, if the protrusion height of the thermal fuse 60 from the electromagnetic coil body 30 is larger than a predetermined value, there is a problem in that when the epoxy injection molded body 40 is molded using an injection molding apparatus, the thermal fuse 60 may be pressed down by the injection molding apparatus to be damaged, thereby resulting in malfunction.

SUMMARY OF THE INVENTION

The present invention is conceived to solve the aforementioned problems in the prior art. An object of the present invention is to provide a field coil assembly for an electromagnetic clutch, wherein a thermal fuse installed to a holder is configured so that the height of the thermal fuse can be adjusted, thereby preventing the thermal fuse from being damaged even if the thermal fuse is pressed down by a injection molding apparatus during a injection molding process of the electromagnetic clutch.

According to an aspect of the present invention for achieving the objects, there is provided a field coil assembly for an electromagnetic clutch, which comprises an electromagnetic coil body formed by winding an electromagnetic coil; a bobbin for supporting the electromagnetic coil body; a field core for receiving the bobbin and the electromagnetic coil body; a holder mounted to the electromagnetic coil body; and a thermal fuse fixed to the holder to be electrically connected to the electromagnetic coil body, wherein the holder having the thermal fuse installed thereto is provided with an elastic member for elastically supporting the thermal fuse.

The elastic member may be an elastic support plate which is partially incised from the holder to elastically support the thermal fuse applied to the thermal fuse installed to the holder.

The field coil assembly may further comprise protrusions respectively formed at both sides of the holder to enclose the thermal fuse, wherein the elastic support plate is formed by protruding a portion of the holder in the same direction as the protrusions.

The elastic member may be a rubber plate installed to the holder.

The elastic member may be a dot formed to protrude from the holder.

Preferred embodiments of the present invention will be described in detail with reference to the following drawings, and accordingly, the features and advantages of the present invention will be more obvious.

BRIEF DESCRIPTION OF THE DRAWINGS

The above objects, and other features and advantages of the present invention will become more apparent after a reading of the following detailed description when taken in conjunction with the drawings, in which.

DESCRIPTION OF THE PREFERRED EMBODIMENT

Figure 1:
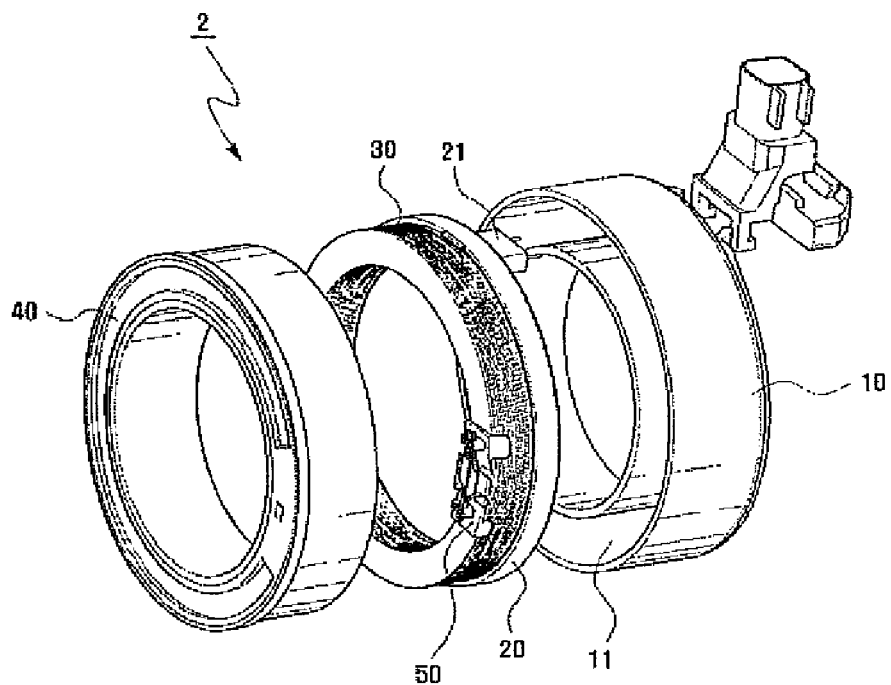
FIG. 1 is an exploded perspective view showing an example of a conventional field coil assembly for an electromagnetic clutch.
Figure 2:
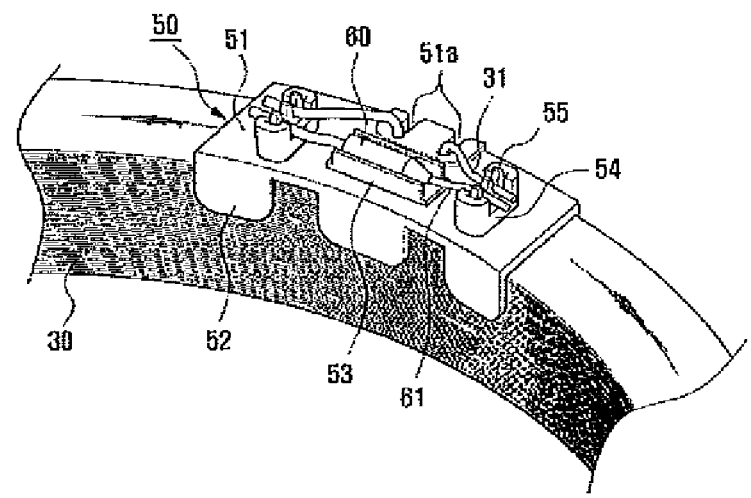
FIG. 2 is a partially enlarged view showing an installation example of a conventional thermal fuse.

Hereinafter, preferred embodiments of a field coil assembly for an electromagnetic clutch according to the present invention will be described with reference to the accompanying drawings.

First, prior to the description of the present invention, throughout the drawings, the same reference numerals are used to designate the same elements as described in the prior art, and the overlapped descriptions will he omitted.

Referring to the figures, a field coil assembly 2 for an electromagnetic clutch according to the present invention includes an electromagnetic coil body 30 formed by winding an electromagnetic coil; a bobbin 20 for receiving and supporting the electromagnetic coil body 30 therein; a field core 10 for receiving the bobbin 20 to protect the bobbin 20 and the electromagnetic coil body 30; and an epoxy injection molded body 40 which is injected into the field core 10 to fill a space between the bobbin 20 and the field core 10 and to fix the bobbin 20 and the electromagnetic coil body 30 into the field core 10.

Figure 3:
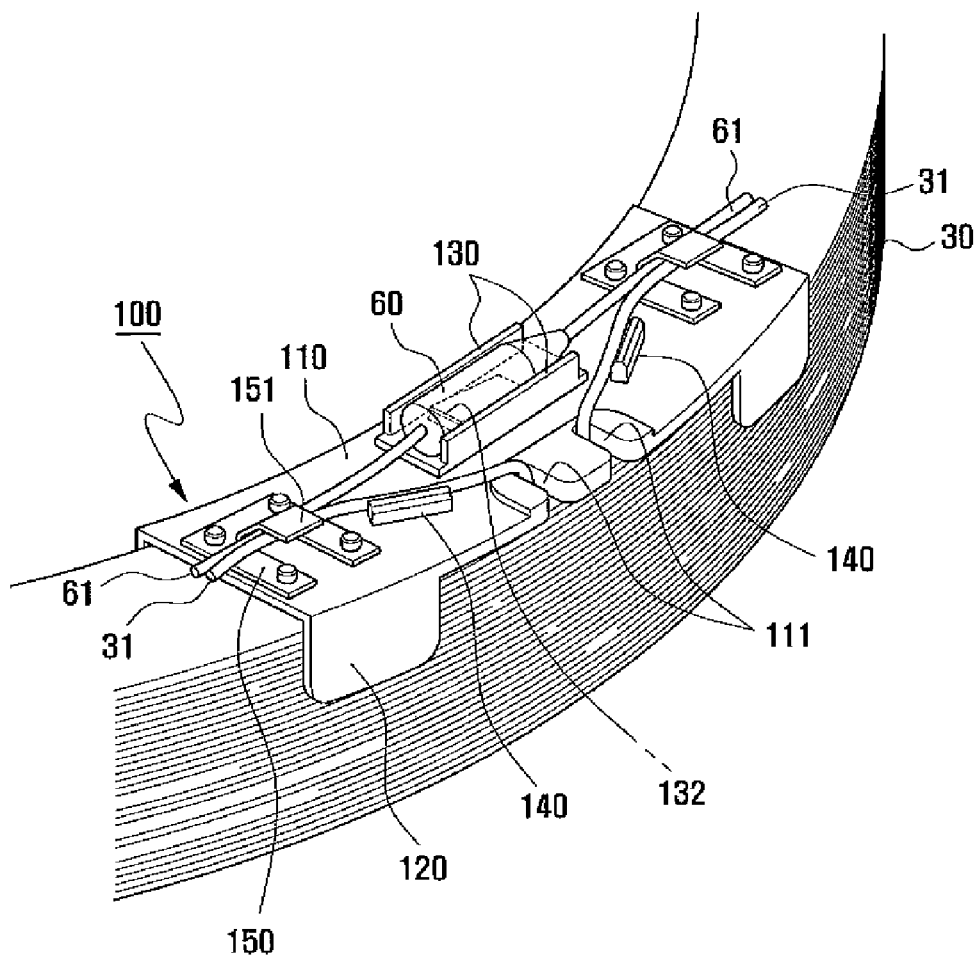
FIG. 3 is a partially enlarged view showing the configuration of a preferred embodiment of a field coil assembly for an electromagnetic clutch according to the present invention.

In addition, as shown in FIG. 3, installed on the outer surface of the electromagnetic coil body 30 provided in the field core 10 as described above is a holder 100, which is an insulating body formed of a circular-arc-typed plate corresponding to the outer surface of the electromagnetic coil body. The holder 100 serves to fix a thermal fuse 60 and to electrically connect the thermal fuse 60 to the electromagnetic coil of the electromagnetic coil body 30.

Figure 4:
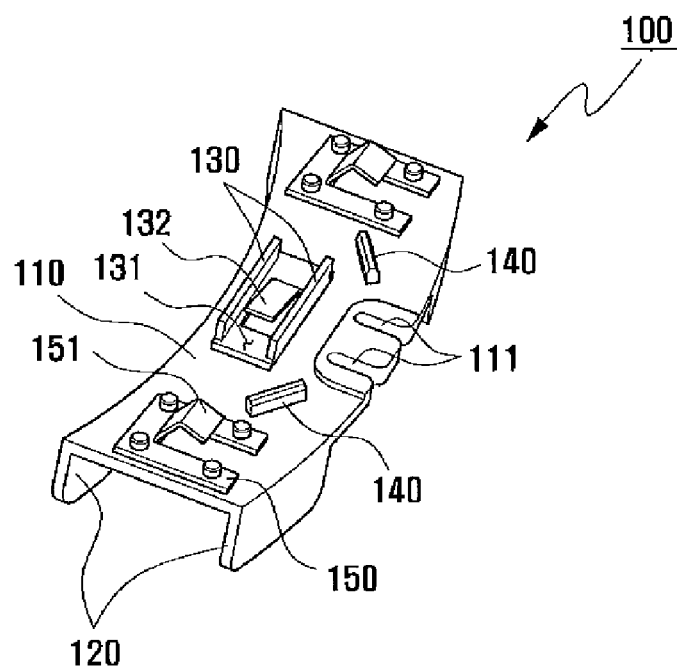
FIG. 4 is a perspective view showing a holder of the embodiment according to the present invention.
Figure 5:
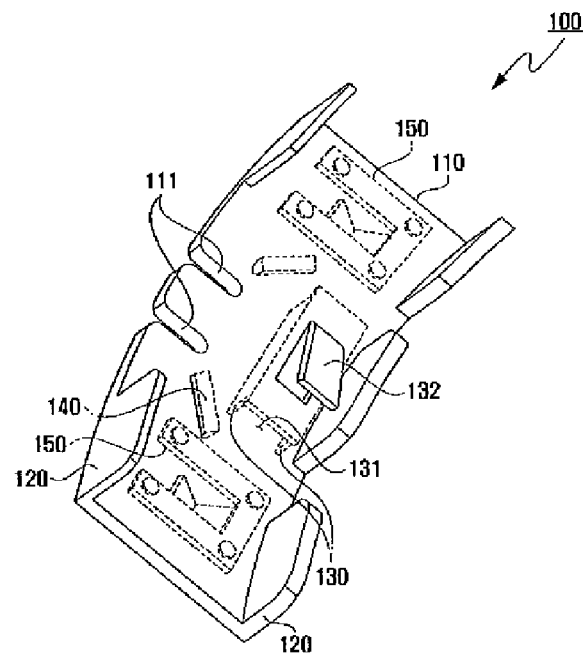
FIG. 5 is a perspective view showing a variant of the holder of the embodiment according to the present invention, in which an elastic support is formed in a direction different from that shown in FIG. 4.

As shown in FIGS. 3 to 5, the external appearance and skeletal structure of the holder 100 is defined by a base 110 which is curved in a circular arc shape along the outer surface of the electromagnetic coil body 30. The base 110 is formed by machining a plate-shaped metal material.

The base 110 is provided with mounting protrusions 120. The mounting protrusions 120 are formed to be bent from both curved side edges of the base 110, and the outer surface of the electromagnetic coil body 30 is partially inserted between the mounting protrusions 120 so that the holder 100 may be fixed to the electromagnetic coil body 30.

Holes 111 are formed in one side of the base 110. The holes 111 are formed by cutting some portions of the base 110, so that lead wires 31 of the electromagnetic coil body 30 are withdrawn through the holes, respectively. In the present embodiment, two holes 111 are formed, and therefore, two lead wires 31 are provided, so that the lead wires 31 protrude through the holes 111 upward from the base 110, respectively.

Guide blocks 140 are formed to protrude on an upper surface of the base 110. The guide blocks 140 are provided on the upper surface of the base 110 adjacent to the holes 111, thereby serving to guide both the lead wires 31 of the electromagnetic coil body 30 withdrawn through the holes 111 toward terminals 150 which will be described later, respectively.

In addition, protrusions 130 protrude on the upper surface of the base 110, i.e., the surface opposite to a surface contacting with the outer surface of the electromagnetic coil body 30. As shown in FIG. 4, the protrusions 130 are provided in a pair in parallel with each other on the upper surface of the base 110, so that a groove 131 is defined therebetween. The groove 131 is a portion on which the thermal fuse 60 is substantially seated, and is formed to have a width corresponding to the thickness of the thermal fuse 60.

The groove 131 is provided with an elastic member. The elastic member is formed in the groove 131 in a direction toward the electromagnetic coil body 30 or away therefrom, thereby serving to elastically support the thermal fuse 60.

More specifically, the elastic member provides a elastic force to the thermal fuse 60 in a direction away from a bottom surface of the groove 131, so that the height of the thermal fuse 60 protruding from the electromagnetic coil body 30 may be varied to some extent even though the thermal fuse 60 is in contact with an interior of a mold in a process of forming the epoxy injection molded body 40 using an injection molding apparatus.

As shown in FIGS. 4 and 5, as the elastic member, an elastic support plate 132 is formed, in which the bottom surface of the groove 131 of the base 110 is partially incised and then an end of the incised segment is bent in a direction away from the outer surface of the electromagnetic coil body 30 or toward it.

Accordingly, the elastic support plate 132 formed as described above comprises a bottom portion connected to the base 110 and a free end portion extending in the upward or downward direction of the holder 100, so that the free end portion is elastically support the thermal fuse 60 in the direction away from the electromagnetic coil body 30.

Particularly, as shown in FIG. 4, the elastic support plate 132 may be bent in the upward direction of the holder 100, i.e., in the direction away from the electromagnetic coil body 30, thereby elastically and directly supporting the thermal fuse 60 in the upward direction. Alternatively, as shown in FIG. 5, the elastic support plate 132 may be protrude in the downward direction of the holder 100, i.e., in the direction toward the outer surface of the electromagnetic coil body 30, to elastically support the holder 100 in the upward direction on the electromagnetic coil body 30, so that the thermal fuse 60 installed to the holder 100 can be elastically and indirectly supported in the upward direction, i.e., in the direction away from the electromagnetic coil body 30.

Figure 6:
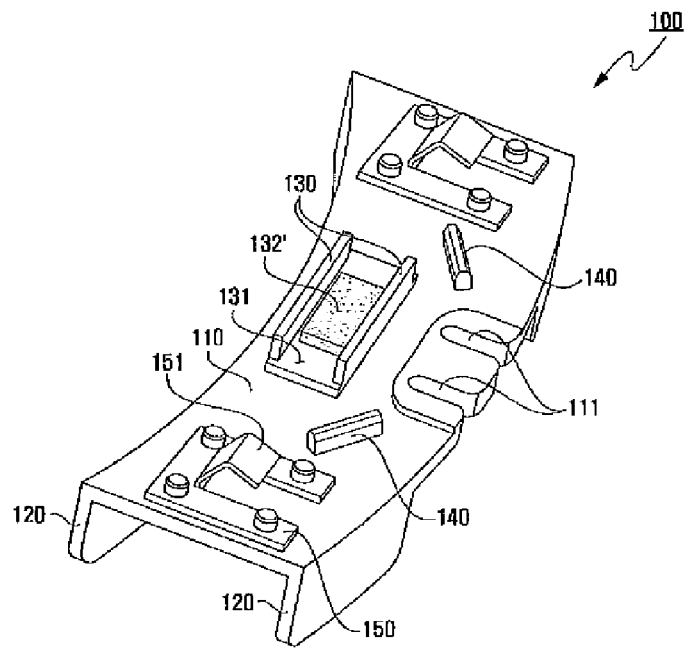
FIG. 6 is a perspective view showing a holder of another embodiment according to the present invention.
Figure 7:
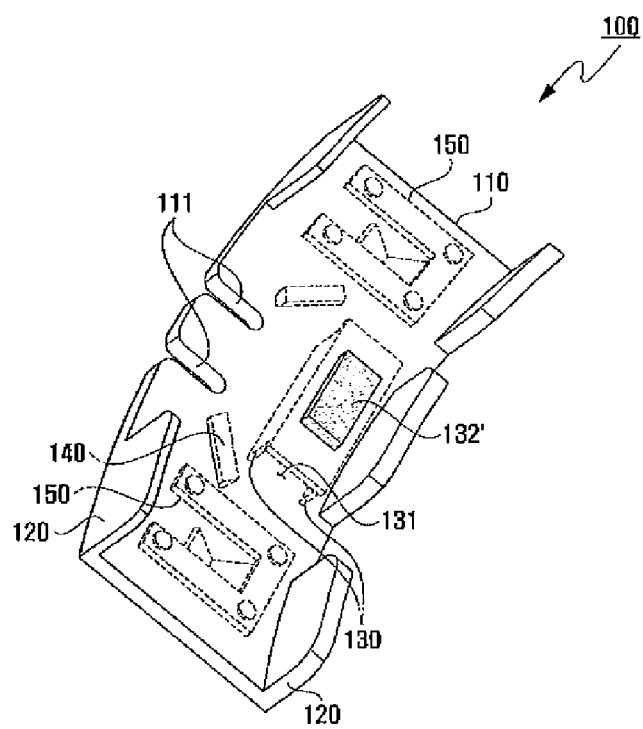
FIG. 7 is a perspective view showing a variant of the holder of the embodiment according to the present invention, in which an elastic support is formed in a direction different from that shown in FIG. 6.

FIGS. 6 and 7 show holders of another embodiment of the present invention. As shown in the figures, the elastic member may be formed by installing a rubber plate 132' either on a bottom surface of the groove 131 on which the thermal fuse 60 is rested or on a rear surface of the base 110 which faces the outer surface of the electromagnetic coil body 30.

At this time, the rubber plate 132' may be formed of an elastic rubber material in the shape of a block, or formed by laminating one or more elastic rubber material layers.

Figure 8:
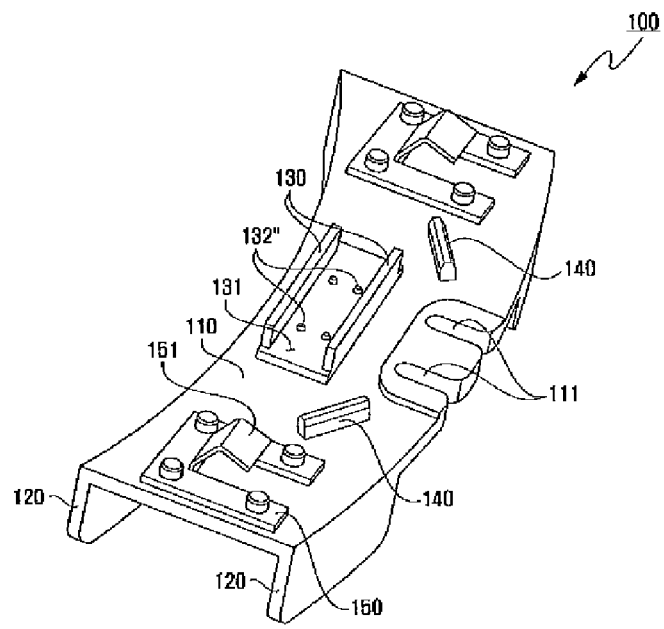
FIG. 8 is a perspective view showing a holder of a further embodiment according to the present invention.
Figure 9:
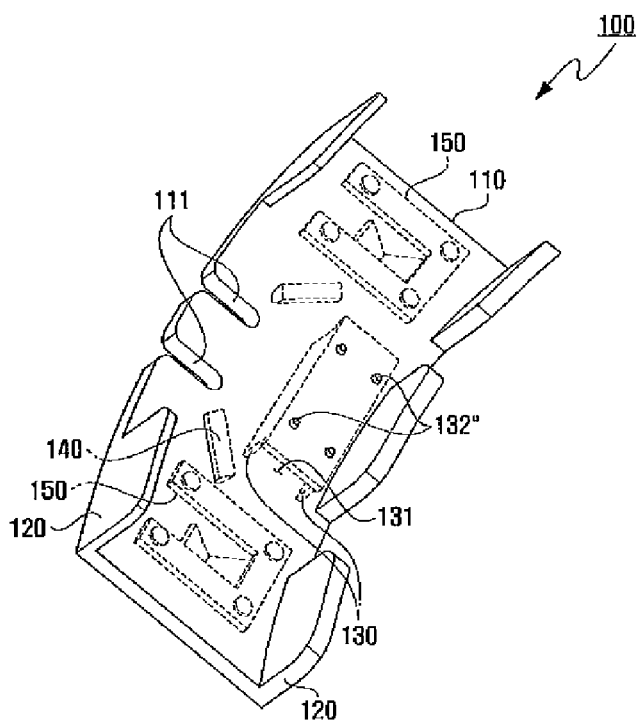
FIG. 9 is a perspective view showing a variant of the holder of the embodiment according to the present invention, in which an elastic support is formed in a direction different from that shown in FIG. 8.

FIGS. 8 and 9 show holders of a further embodiment of the present invention. As shown in the figures, the elastic member may be formed of dots 132" which are formed by projecting portions of the base 110 of the holder 100.

More specifically, the dots 132" may be formed by projecting some portions of the base 110 in a direction toward the outer surface of the electromagnetic coil body 30 or in the opposite direction thereto, and the dots 132" may be formed in the shape of a kind of a concavo-convex portion by embossing the holder 100 using a press die.

Such dots 132" may be elastically deformed to some extent depending on properties of the material and shape thereof, so that it is possible to elastically support the thermal fuse 60 in the direction away from the electromagnetic coil body 30. That is, when the dots 132" protrude upward from the base 110, the thermal fuse 60 may be elastically and directly supported upwards (the embodiment shown in FIG. 8), while the dots 132" may protrude downward from the holder 100, i.e., in the direction toward the outer surface of the electromagnetic coil body 30, to elastically support the holder 100 upwards on the electromagnetic coil body 30, so that the thermal fuse 60 may be elastically and indirectly supported upwards.

At this time, the elastic member may be shaped as a bead which is formed by elongatedly protruding a portion of the base 110 of the holder 100. Such a bead may be elastically deformed to some extent depending on properties of the material and shape thereof, so that the bead may elastically support the thermal fuse 60 in the direction away from the electromagnetic coil body 30.

Meanwhile, the terminals 150 are installed at both sides of the base 110 with the protrusions 130 as the center. The terminals 150 are connected to the lead wires 61 of the thermal fuse 60 and the lead wires 31 of the electromagnetic coil body 30, thereby serving to electrically connect the thermal fuse 60 and the electromagnetic coil body 30 to each other.

Each terminal 150 is fixedly installed to the base 110, and a connection plate 151 for pressing down its corresponding lead wire 31 or 61 toward the base 110 is formed in the central portion of the terminal 150 to be bent and protrude upwards.

Accordingly, the holder 100 having the elastic member as described above elastically support the thermal fuse 60 mounted to the groove 131 of the protrusions 130, so that the protrusion height of the thermal fuse 60 can be variable. As such, even if the nonuniform height of the electromagnetic coil body 30 causes the thermal fuse 60 to be in contact with the injection molding apparatus, the elastic member is bent or pressed so that the height of the thermal fuse 60 can be adjusted, thereby preventing the thermal fuse 60 from being pressed or damaged as well as from being malfunctioned or deteriorated.

The height-adjustable operation of the thermal fuse 60 as described above causes the thermal fuse 60, which is exposed through the epoxy injection molded body 40, to be evenly exposed with a uniform height.

According to the field coil assembly for an electromagnetic clutch of the present invention, the height of the thermal fuse installed to the holder can be adjusted. As such, even if the thermal fuse is in contact with a mold during an injection process, since the pressing phenomenon on the thermal fuse cannot be generated, there is an advantage in that the thermal fuse can be prevented from being damaged as well as from being malfunctioned.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A field coil assembly for an electromagnetic clutch, comprising:
   an electromagnetic coil body formed by winding an electromagnetic coil;
   a bobbin for supporting the electromagnetic coil body;
   a field core for receiving the bobbin and the electromagnetic coil body;
   a holder mounted to the electromagnetic coil body; and
   a thermal fuse fixed to the holder to be electrically connected to the electromagnetic coil body,
   wherein the holder having the thermal fuse installed thereto is provided with an elastic member configured so that the height of the thermal fuse can be adjusted, and
   wherein the elastic member is an elastic support plate which is partially incised from the holder to elastically support the thermal fuse installed to the holder.

2. The field coil assembly as claimed in claim 1, further comprising protrusions respectively formed at both sides of the holder to enclose the thermal fuse, wherein the elastic support plate is formed by protruding a portion of the holder in the same direction as the protrusions.

3. A field coil assembly for an electromagnetic clutch, comprising:
   an electromagnetic coil body formed by winding an electromagnetic coil;
   a bobbin for supporting the electromagnetic coil body;
   a field core for receiving the bobbin and the electromagnetic coil body;
   a holder mounted to the electromagnetic coil body; and
   a thermal fuse fixed to the holder to be electrically connected to the electromagnetic coil body,
   wherein the holder having the thermal fuse installed thereto is provided with an elastic member configured so that the height of the thermal fuse can be adjusted, and
   wherein the elastic member is a rubber plate installed to the holder.

4. A field coil assembly for an electromagnetic clutch, comprising:
   an electromagnetic coil body formed by winding an electromagnetic coil;
   a bobbin for supporting the electromagnetic coil body;
   a field core for receiving the bobbin and the electromagnetic coil body;
   a holder mounted to the electromagnetic coil body; and
   a thermal fuse fixed to the holder to be electrically connected to the electromagnetic coil body,
   wherein the holder having the thermal fuse installed thereto is provided with an elastic member configured so that the height of the thermal fuse can be adjusted, and
   wherein the elastic member is a dot formed to protrude from the holder.

* * * * *